(12) United States Patent
Briesch et al.

(10) Patent No.: US 8,061,002 B2
(45) Date of Patent: Nov. 22, 2011

(54) COMBINED CYCLE POWER GENERATION

(75) Inventors: Michael S. Briesch, Orlando, FL (US);
Terrence B. Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1180 days.

(21) Appl. No.: 11/824,421

(22) Filed: Jun. 29, 2007

(65) Prior Publication Data
US 2008/0000237 A1    Jan. 3, 2008

Related U.S. Application Data

(60) Provisional application No. 60/817,566, filed on Jun. 29, 2006.

(51) Int. Cl.
*B21K 21/16* (2006.01)
*F02C 1/00* (2006.01)
(52) U.S. Cl. .......................... 29/401.1; 60/772
(58) Field of Classification Search .............. 29/401.1, 29/428, 890.031, 890.03; 60/772, 39.182, 60/39.04, 728
See application file for complete search history.

(56) References Cited

U.S. PATENT DOCUMENTS

| 3,974,645 A | | 8/1976 | Smith |
| 4,858,562 A | * | 8/1989 | Arakawa et al. .............. 122/7 R |
| 5,375,410 A | | 12/1994 | Briesch et al. |
| 6,173,563 B1 | * | 1/2001 | Vakil et al. ...................... 60/772 |

* cited by examiner

Primary Examiner — John C Hong

(57) ABSTRACT

A system (10) and method of modifying a combined cycle power generation system (12, 14, 16, 18). In one embodiment of the invention an existing system includes one or more first gas turbines, one or more first steam turbines, and one or more heat recovery steam generators (HRSGs). An exemplary method includes providing at least one second gas turbine of greater operating efficiency than each of the one or more first gas turbines and connecting at least one existing HRSG to receive exhaust output from the second gas turbine to generate steam. Also according to the invention a path is provided for mixing steam exiting a high pressure steam turbine with steam generated in a low pressure HRSG to route such mixed steam through a reheat section of a high temperature, high pressure HRSG so that reheated mixed steam exiting the reheat section can be routed into a low pressure steam turbine.

13 Claims, 3 Drawing Sheets and sizes are contemplated to be within the scope of the invention. That is, the invention is not limited in scope to the specific configurations disclosed.

COMBINED CYCLE POWER GENERATION

This application claims benefit of the 29 Jun. 2006 filing date of U.S. provisional patent application 60/817,566.

FIELD OF THE INVENTION

This invention relates generally to power generation systems and, more particularly, to combined cycle systems of the type which incorporate steam turbines and combustion turbines.

BACKGROUND OF THE INVENTION

Combined cycle power plants have come into widespread use because they incorporate heat exchangers that can recover heat from the hot gas exhaust stream of a combustion engine. Conventionally the recovered heat is used to generate the working fluid of a steam turbine. This results in more efficient power generation than is achievable with only a combustion turbine or only a steam turbine. See, for example, U.S. Pat. No. 5,375,410 which is assigned to the assignee of the present invention and incorporated herein by reference.

Some combined cycle power plants have been deployed for one or more decades during which time numerous improvements in both component and system design have increased the output levels and efficiencies of electric power generation systems. Consequently, with a continued increase in fuel costs, consideration has been given to replacing older, less efficient systems with newer, more efficient designs. Because these are capital intensive expenditures accompanied by relatively lengthy periods of time before which a return on investment is realized, undertakings to replace older, less efficient power plants can be difficult to finance. Therefore it is desirable to find ways to realize the efficiencies achievable with newer component and system designs with smaller capital expenditures.

BRIEF DESCRIPTION OF THE DRAWINGS

The invention is explained in the following description in view of the drawings that show.

DETAILED DESCRIPTION OF THE INVENTION

The invention is described in the context of an upgrade to an existing combined cycle electric power generation system which can provide greater power output, higher efficiency and more cost effective capital investment. However, the concepts disclosed herein are more generally applicable to improving operating efficiencies by forming systems with a variety of equipment types having similar functions, e.g., heat recovery for steam generation, but being of different design. A feature of the invention is assembly of equipment derived from different generations of design. This may include plant equipment having been previously placed in service in combination with new plant equipment, the combination operating cooperatively to provide a relatively efficient power generation system. Such a resulting system can realize significant improvements in efficiency goals while requiring less capital investment than another system of similar power and operating efficiency when the other system is assembled without plant equipment that has previously been placed in service.

Figure 1:
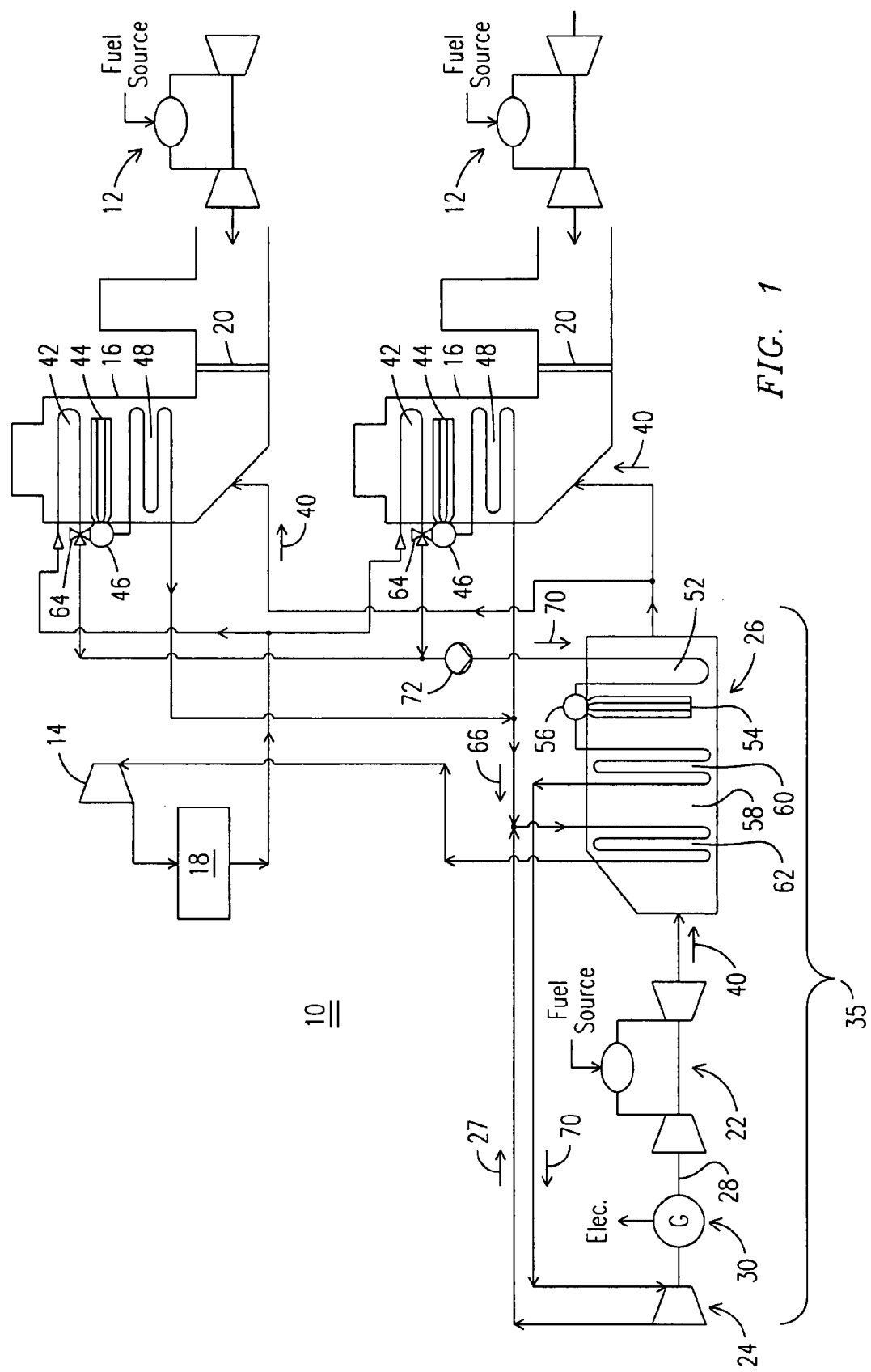
FIG. 1 illustrates a combined cycle system according to an embodiment of the invention.

FIG. 1 illustrates an exemplary embodiment of a combined cycle system 10 formed with a combination of equipment having been previously placed in service, and newer plant equipment. The system 10 incorporates a series of relatively old power generating components, including a pair of relatively low output, low efficiency gas turbines 12, one or more low pressure steam turbines 14, a pair of Heat Recovery Steam Generators (HRSGs) 16, and a condenser 18 coupled to receive working fluid from a turbine 14. All of the foregoing components 12, 14, 16 and 18 are referred to as existing components because they are representative of equipment previously placed in service, although configurations and sizes vary. Partition plates 20 are shown positioned between each existing gas turbine 12 and an existing HRSG 16 to isolate the turbines 12 and thereby block flow originating in other portions of the system 10 from passing into the turbines 12. In addition, the system 10 includes a series of relatively new, more efficient components, including one or more high power, high temperature gas turbines 22, one or more high pressure steam turbines 24, and one or more high temperature high pressure (HTHP) HRSGs 26. The gas turbine 22 and the steam turbine 24 are illustrated as configured with a common rotor shaft 28 to drive a generator 30, although the turbines 22 and 24 could be coupled along different shafts to each turn a different generator. The aforementioned, relatively new or more efficient components, including the turbines 22 and 24, one or more HRSGs 26 and the generator 30, are referred to herein as upgrade components. The combination of a gas turbine 22, a high pressure steam turbine, a HTHP HRSG 26 and, optionally, a generator 30 coupled, for example, to the same drive shaft 28, form power module 35.

The upgrade gas turbine 22 may have a higher power output and produce higher temperature exhaust gas than the existing turbine 12. For example, an upgrade combustion turbine 22 may provide a power increase on the order of 20 to 120 MW or more, relative to an existing turbine 12, or perhaps approximately four times as much power output as an existing turbine 12. The higher exhaust gas temperature may be, for example, 30 to 120 degrees C., greater than the temperature of exhaust gas at the output of the existing gas turbine 12.

Descriptions in the text and in the figures of a single component are to be understood as representative of embodiments including multiple components having similar or complementary functions. Such variations are choices which become apparent based on considerations of cost and system efficiencies. Accordingly, illustration of a component is a symbolic representation used to imply multiple configurations, e.g., which may comprise or be replaced with two or more components, be they identical or not. The alternatives may be selected based on functional equivalence, or with recognition that variations should be considered based on cost, power output and efficiency. Thus a single component may be replaced with multiple other components about the same position, perhaps in a parallel configuration or in a serial sequence in which different components are optimized to provide individual stages, e.g., based on variations in pressures or temperatures.

Accordingly, reference to one component, e.g., a steam turbine 10, does not only imply that a single unit can be replaced with multiple identical units. Instead, such reference to a component contemplates multiple implementations of varied components individually or collectively to provide a desired function. Thus with reference to a steam turbine any of several well known multiple component configurations may be placed in the same position, including, for example, a sequence of low pressure, intermediate pressure and high pressure turbines arranged in series. Similarly, illustration of an existing or upgrade HRSG, implies embodiments which include multiple HRSGs that may be connected in series or interconnected in a manner which segregates varying pressures of working fluid for injection at different steam turbine inputs.

The existing components of the system 10 correspond to hardware used in an operational combined cycle electric power generation system prior to incorporation of the upgrade components. The original system and the system 10 include other conventional components which are not described in the figures in order to more clearly illustrate features more relevant to the invention.

During operation of the system 10 a fuel source drives the upgrade gas turbine 22 to turn the generator 30. Exhaust gas 40 from the turbine 22 is sent through the HTHP HRSG 26 and then through each of the existing HRSGs 16 after which it is vented. The existing HRSGs 16 function as economizers and low pressure steam generators in cooperation with a high temperature section of the HTHP HRSG 26, which also receives cold reheat steam 27 from the upgrade steam turbine 24. A section of the HTHP HRSG 26 further elevates the reheat steam temperature prior to input into the existing steam turbine 14, at pressure conditions lower than the input pressure to the upgrade steam turbine 24.

The existing HRSGs 16 each include three stages: an economizer 42 that heats water that originates from steam exiting the steam turbine 14 and which flows from the condenser in liquid form, through an evaporator 44 coupled to a steam drum 46; and into a superheater 48. The HTHP HRSG includes an economizer 52, an evaporator 54 coupled to a steam drum 56 and a superheater 58. The superheater 58 includes a first section 60, which receives fluid sent through the economizer 52 and the evaporator 54, for input of steam to the high pressure high temperature turbine 24. A reheater section 62 of the superheater 58 provides input to the low pressure existing steam turbine 14. Although details of such are not shown in the figures, the illustrated HRSGs 16 and 26 may each include flow paths for multi-pressure circuits each comprising an economizer, an evaporator and a superheater.

Specifically, cold reheat steam 27 exits the upgrade steam turbine 24 and is mixed with low pressure steam 66 exiting the superheaters 48 of the existing HRSGs 16. This mixture enters the second section 62 of the superheater 58 where temperature is elevated prior to sending the mixture of steam 27 and steam 66 into the low pressure steam turbine 14. The mixture of steam 27, 66 is injected into the reheater section 62 of the superheater 58 where temperature is elevated. The superheated steam exiting the reheater section 62 travels along a flow line to enter the existing steam turbine 14. Fluid exiting this turbine 14 flows through the condenser 18 and is then fed into the economizers 42 of each existing HRSG 16 for re-heating. The re-heated fluid is then converted into steam as the fluid flows through an adjoining evaporator 44. This is followed by further temperature elevation as the steam flows through a superheater 48.

Valves 64 are positioned to remove portions of the working fluid after the fluid has passed through the economizer 42 of each existing HRSG 16 to transfer a variable portion 70 of the heated fluid along flow lines, through a pressurizing pump 72 and to the HTHP HRSG economizer 52. In the HRSG 26 this portion 70 of the fluid is further heated under higher pressure conditions, then sent into the evaporator 54 and through the first section 60 of the superheater 58. The fluid is then sent into the high temperature high pressure steam turbine 24.

Numerous alternate arrangements of components may be implemented in lieu of the layout presented in FIG. 1. For example, a higher level of power generation and efficiency may be effected when each existing HRSG is capable of accepting the complete flow rate of the higher output gas turbine 22. In such instances, there may be two power modules 35, each comprising at least a gas turbine 22, a high pressure steam turbine 24 and a HTHP HRSG 26. The two modules 35 may be formed on separate drive shafts 28 or may share a common shaft with one generator 30 and one steam turbine 24.

With each of the two gas turbines 22 coupled to flow exhaust gas through a different HTHP HRSG 26, each of the existing HRSGs 16 can receive all of the exhaust flow from one HRSG 26. Each existing HRSG may be coupled to receive part or all of the fluid being output from a condenser 18 associated with an existing steam turbine 14 to begin reheating of condensate and steam formation. Accordingly, there may be multiple existing turbines 14 and condensers 18 in the system 10.

Next, a portion of the generated steam can be transferred from each existing HRSG 16 to a different HTHP HRSG 26 for superheating prior to input to one or more high temperature high pressure steam turbines 24. Simultaneously, another portion of the generated steam can be processed by a high temperature section 62 of an HTHP HRSG 26 to provide input to an existing steam turbine 14. Summarily, instead of using two existing HRSGs 16 in cooperation with one HTHP HRSG 26, each existing HRSG 16 can be coupled to a separate module 35 in an analogous functional manner.

In another configuration of the system 10 the exhaust from the upgrade gas turbine may be split and input directly into two or more existing HRSGs 16 without flowing through an intervening HTHP HRSG 26. In still other embodiments of the system 10 one or more additional HRSGs, designed to operate at progressively lower temperatures than the existing HRSGs 16, may be coupled in series with each existing HRSG 16 in order to extract power from lower grade cycle heat. Such low temperature HRSGs (LT HRSGs) can create low pressure steam or preheat feedwater prior to input to higher pressure cycles. Low pressure steam generated by the LT HRSGs may be routed to a plant aerator, an existing steam turbine 14 or an added low pressure steam turbine.

With plant efficiency being a goal in the design of the system 10, it remains a desire in the art to maximize conversion of energy present in the gas turbine exhaust flow into steam, as this can maximize steam turbine output power. A method of utilizing the exhaust energy as efficiently as possible involves generating steam at multiple pressure levels. That is, work can be extracted from lower energy sources by generating lower pressure steam. Accordingly, the combined cycle water/steam cycle can include three pressure levels: high pressure (HP), intermediate pressure (IP), and low pressure (LP), including a single reheat loop to increase the temperature of steam entering the IP ST. This design basis offers optimal performance because it allows for steam formation at multiple temperature levels. Hence, as gas turbine exhaust is cooled during movement along heat recovery surfaces to produce high temperature, high pressure steam, residual energy present in the lower temperature exhaust can be used to generate LP steam. When designing a multiple pressure water/steam cycle, optimal energy extraction is dependent on selection of the pressure levels at which steam is to be formed. If the relative pressure levels of HP, IP, and LP steam are not properly selected, then plant performance will be sub-optimal. For example, if the HP and IP pressure levels are too close to one another, the corresponding boiling temperatures will also be close to one another, this resulting in relatively little IP steam generation.

Typical HP, IP, LP values for a modern CC plant are drum pressures of 2000 psia 138 bara ($T_{sat}$=636 F, 335 C), 500 psia 34 bara($T_{sat}$=467 F, 242 C), and 70 psia (5 bara) ($T_{sat}$=300 F,149 C). When re-powering an existing combined cycle plant as shown in FIG. 1, e.g., by adding pressure levels to the prior existing system, the pressure/flow relationship of the existing steam turbine 14 can force the IP circuit of the repowered plant to have a drum pressure much higher than the optimal pressure. However, according to an embodiment of the invention, by removing blades or rows of blades from the existing ST, the pressure/flow relationship of the circuit can be modified to depress the drum pressure to a range which more effectively extracts energy from low temperature exhaust, thereby generating additional megawatts of power through a steam turbine.

Figure 2A:
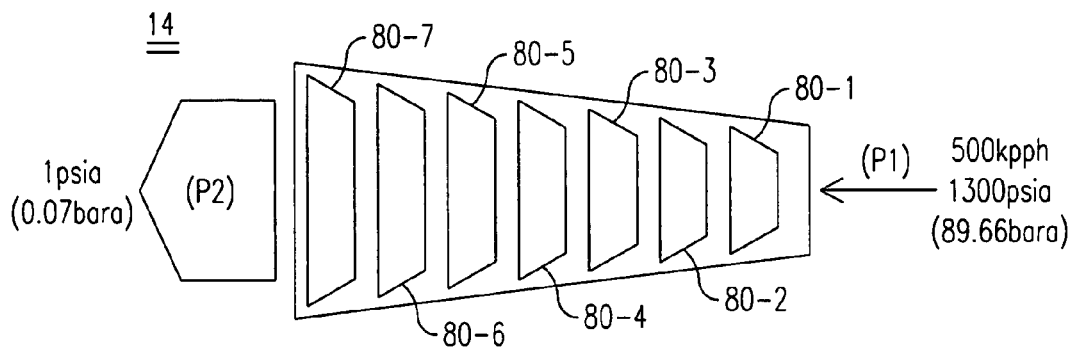
FIGS. 2A and 2B illustrate a design modification to a turbine according to an embodiment of the invention.
Figure 2B:
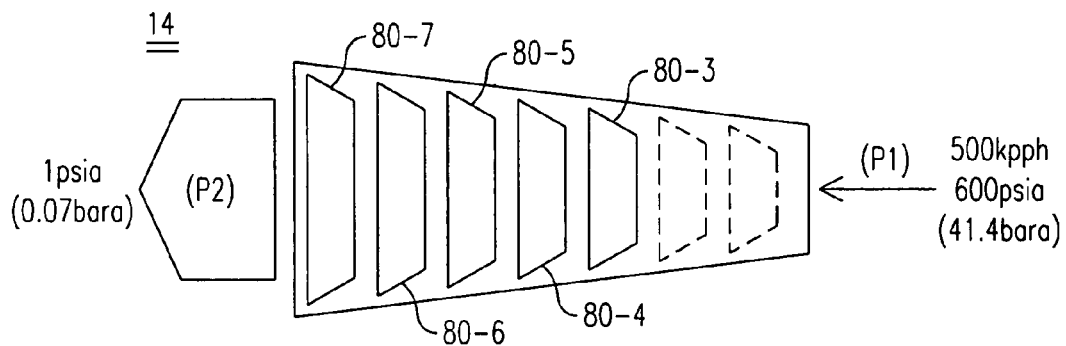

FIGS. 2A and 2B illustrate a design modification to an existing steam turbine 14 to effect reduction in drum pressure. For purposes of illustration, prior to modification, as shown in FIG. 2A, an existing steam turbine 14 is shown to have seven stages 80-1 to 80-7 of blades although the actual number of rows of blades will vary. The exemplary stages of blades have a characteristic intake pressure P1 of 89.66 bara and develop an exemplary intake/exhaust pressure differential P1/P2 of 89.66 bara/0.07 bara (1300 psia/1 psia)=1300, with a mass flow rate of 500 kilopounds per hour (KPPH) (63 kg/s). By removing two stages of blades, e.g., stages 80-1 and 80-2, as shown in FIG. 2B, the intake Pressure P1 can become reduced to 600 bara (41.4 bara) such that the intake/exhaust pressure differential P1/P2 can be reduced to 600 while maintaining the same 500 KPPH (63 kg/s) mass flow rate. The number of stages 80 of blades which are to be removed will vary based on the number of stages in the turbine and the desired pressure reduction.

Figure 3A:
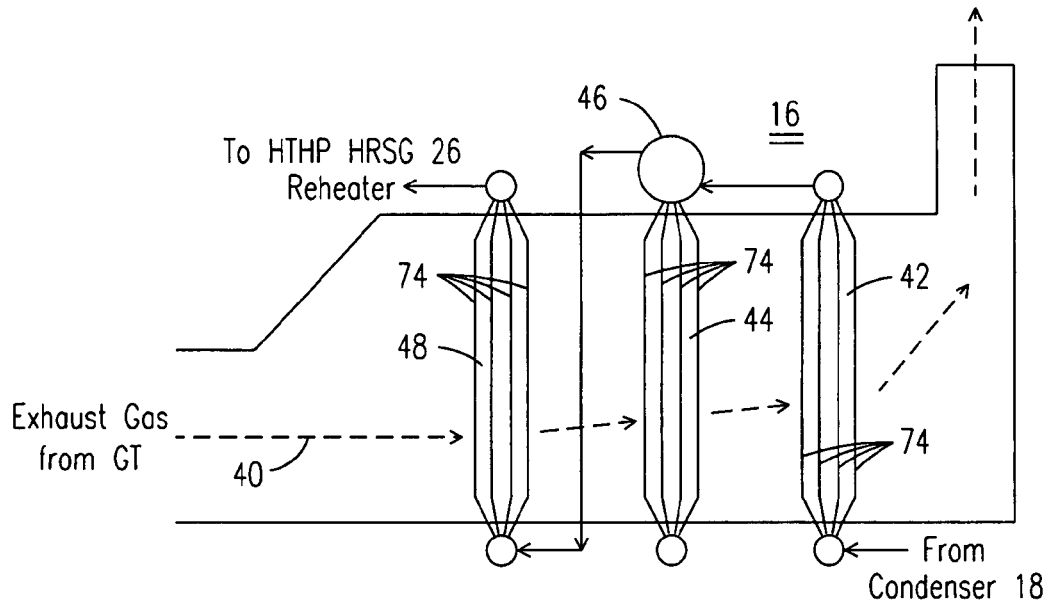
FIGS. 3A and 3B are simplified before and after views of an HRSG illustrating an exemplary modification according to the invention.
Figure 3B:
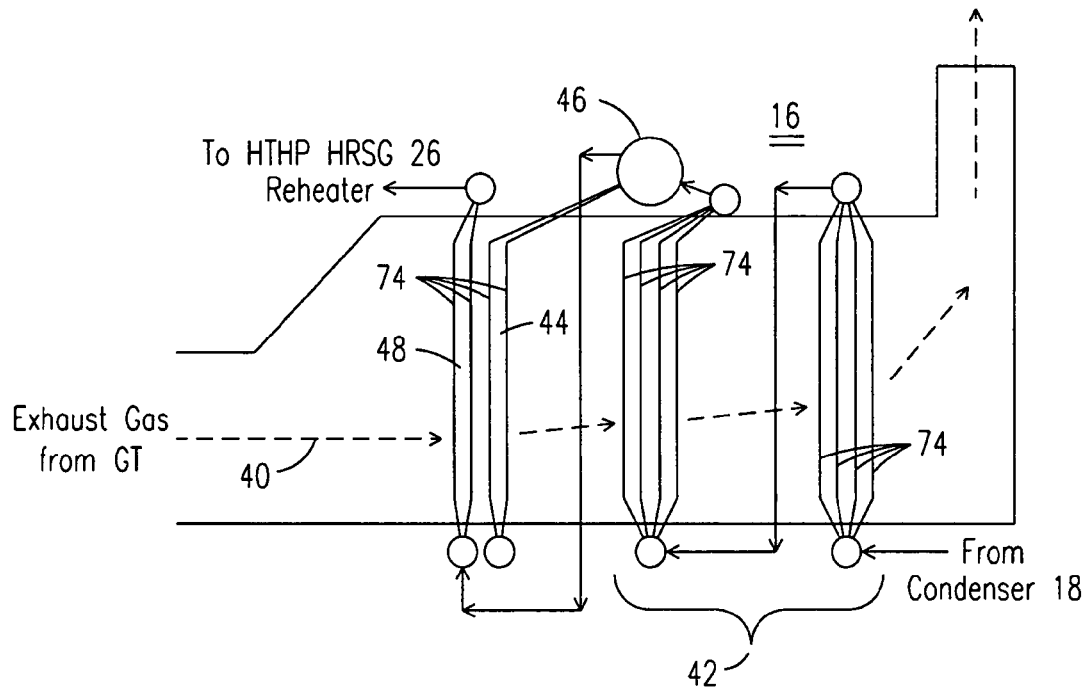

FIGS. 3A and 3B are simplified "before" and "after" schematic illustrations of a conventional HRSG 16 which, according to the invention, is modified to provide more optimal heating surface areas among the economizer, evaporator and superheater sections. In FIG. 3A the economizer 42, evaporator 44 and superheater 48 are simplistically shown with each comprising four tubes 74 (although many more tubes are normally present) representative of heat transfer surface area. Within each section of the HRSGs 16 the tubes 74 may be plumbed in a parallel or serial manner, or in a combined parallel and serial arrangement, to optimally move a volumetric flow rate there through to transfer heat from a flow of gas turbine exhaust 40.

In the conventional arrangement of FIG. 3A water from the condenser 18 enters the economizer 42 and flows through the HRSG 16 to exit the superheater 48 from which it is transferred to the superheater section 62 of the HRSG as shown in FIG. 1. However, in order for a HRSG 16 to better recover energy from low temperature exhaust flow received from the HTHP HRSG 26, it is desirable to proportionately increase the heat exchange surface area of the economizer relative to the evaporator and superheater. Accordingly, in the modified arrangement of FIG. 3B, some of the heat exchange surface area of the evaporator 44 is transferred to the economizer 42 by replumbing some of the tubes 74 so they facilitate heat transfer in the economizer 42 instead of in the evaporator 44. This is schematically illustrated by showing four of the evaporator tubes 74 as plumbed into the economizer 42. Also is the modified arrangement of FIG. 3b, some of the heat exchange surface area of the superheater 48 is transferred to the evaporator 46 by replumbing some of the tubes 74 so they facilitate heat transfer in the evaporator 44 instead of in the superheater 48. This is schematically illustrated by showing two of the superheater tubes 74 as plumbed into the drum 46. As a result, two tubes are connected to the superheater 48, two tubes are connected to the drum 46 and eight tubes 74 are connected to the economizer 42 so that the economizer section has four times more heat exchange surface area than the superheater section or the evaporator section. Commonly an existing HRSG 16 will have many more tubes 74 than are simplistically illustrated in FIGS. 3 such that a larger number of the tubes can be replumbed among multiple sections, e.g., the economizer 42, the evaporator 44 and the superheater 48, to effect a more optimum distribution of heat transfer surface area among HRSG sections.

The arrangement of FIG. 3B is useful in the system 10 because exhaust gas flowing from the HTHP HRSG into the existing HRSGs is relatively cool and better suited for preheating of liquid working fluid in the economizer. Advantageously, with replumbing of the tubes 74, the relative functions of the existing HRSG 16 may be shifted as desired, e.g., to provide a greater proportion of pre-heating (economization) and less steam generation. With the system 10 providing a majority of feedwater to the HTHP HRSG 26, the existing HRSGs 16 may be replumbed to have diminished evaporator surface area requirements. More generally, replumbing, such as in the example of FIG. 3B, enables an improved thermal match between exhaust gas received from the second gas turbine and the existing HRSG to provide water pre-heating and steam generating or superheating characteristics which improve overall efficiency of the modified combined cycle power generation system 10.

From the foregoing there has been described a method of modifying an existing combined cycle power generation system by providing at least one additional gas turbine of greater operating efficiency than the one or more existing gas turbines, and connecting at least one existing HRSG to receive exhaust output from the additional gas turbine to generate steam.

While various embodiments of the present invention have been shown and described herein, such embodiments are provided by way of example only. Numerous variations, changes and substitutions may be made without departing from the invention herein. Accordingly, the scope of the invention is only limited by the claims which follow.

The invention claimed is:

1. A method of modifying a combined cycle power generation system including, as equipment in a prior system configuration, one or more first gas turbines, one or more first steam turbines, and one or more existing heat recovery steam generators (HRSGs) each having been positioned to receive an output from the one or more of the first gas turbines, comprising the steps of:
   providing at least one second gas turbine of greater operating efficiency than each of the one or more first gas turbines; and
   connecting at least one existing HRSG to receive exhaust output from the second gas turbine to generate steam.

2. The method of claim 1 wherein steam generated from the at least one of the existing heat recovery steam generators, based on exhaust output from the second gas turbine, is input to at least one of the one or more first steam turbines.

3. The method of claim 2 further including the step of removing blades from a portion of the at least one of the one or more first steam turbines to reduce pressure of steam being input to the at least one of the one or more first steam turbines from an existing HRSG.

4. The method of claim 3 further including the step of modifying the relative distribution of heat exchange surface area among sections within at least one of the existing HRSG's.

5. The method of claim 1 further including the step of modifying a relative distribution of heat recovery tubes among sections within at least one of the existing HRSG's to provide a more optimum distribution of steam being output from among the sections for energy conversion via one of the first steam turbines or an additional steam turbine.

6. The method of claim 5 wherein the at least one existing HRSG includes a low pressure economizer surface section, an intermediate pressure evaporator surface section and a high pressure superheater surface section, and the step of modifying includes re-plumbing evaporator surface area into the low pressure economizer surface section to increase flow path surface area through the economizer section.

7. The method of claim 6 wherein the step of modifying improves thermal match between exhaust gas received from the second gas turbine and the existing HRSG to provide steam generating characteristics which improve overall efficiency of the modified combined cycle power generation system.

8. The method of claim 5 wherein the at least one existing HRSG includes an economizer surface section, an evaporator surface section and a superheater surface section, and the step of modifying includes re-plumbing superheater surface area to increase flow path heat exchange surface area through the evaporator surface section to improve overall efficiency of the modified combined cycle power generation system.

9. The method of claim 1 wherein the step of connecting includes connecting at least two existing heat recovery steam generators to receive exhaust output from the second gas turbine to generate steam.

10. The method of claim 1 further including the steps of positioning a high pressure, high temperature HRSG to receive relatively high temperature exhaust gas directly from the at least one second gas turbine and positioning an additional steam turbine to receive a steam output from the high pressure, high temperature HRSG, wherein the additional steam turbine is designed to receive steam at a higher pressure than at least one of the first steam turbines.

11. The method of claim 10 wherein the step of positioning the additional steam turbine includes connecting steam output from a first section of the high pressure, high temperature HRSG to provide an input to the additional steam turbine, and the method further includes the step of connecting steam output from a second section of the high pressure, high temperature HRSG to provide an input to at least one first steam turbine.

12. The method of claim 10 further including coupling a relatively low temperature output of exhaust gas from the high pressure high temperature HRSG to at least two existing HRSGs.

13. The method of claim 1 applied to a system including one first steam turbine, at least one additional steam turbine designed to receive higher pressure steam than the one first steam turbine, two existing HRSGs and two first gas turbines, the method including coupling both existing HRSGs to receive exhaust gas from the at least one second gas turbine while also providing exhaust gas from the at least one second gas turbine to the at least one additional steam turbine.

* * * * *